United States Patent
Mallya et al.

(10) Patent No.: US 7,720,719 B2
(45) Date of Patent: May 18, 2010

(54) METHOD AND SYSTEM FOR IMPS-BASED TRANSIENT OBJECTS

(75) Inventors: Satya Mallya, San Jose, CA (US); Santhana Krishnasamy, South San Francisco, CA (US); Wilson Lau, South San Francisco, CA (US)

(73) Assignee: France Telecom, Paris (FR)

( * ) Notice: Subject to any disclaimer, the term of this patent is extended or adjusted under 35 U.S.C. 154(b) by 919 days.

(21) Appl. No.: 10/911,543

(22) Filed: Aug. 5, 2004

(65) Prior Publication Data

US 2006/0031080 A1 Feb. 9, 2006

(51) Int. Cl.
*G06Q 30/00* (2006.01)
(52) U.S. Cl. .............................. 705/26; 705/1; 705/10; 705/14; 705/27; 705/37; 707/1; 709/224; 709/226; 709/227; 715/765; 715/772; 370/261; 455/466
(58) Field of Classification Search ...................... 705/1, 705/26, 37, 80, 75; 709/226, 227; 455/466; 715/765
See application file for complete search history.

(56) References Cited

U.S. PATENT DOCUMENTS

| | | | | |
|---|---|---|---|---|
| 5,974,398 | A * | 10/1999 | Hanson et al. | 705/14.64 |
| 6,564,261 | B1 * | 5/2003 | Gudjonsson et al. | 709/227 |
| 6,732,364 | B1 | 5/2004 | Bhaskaran et al. | |
| 6,763,384 | B1 * | 7/2004 | Gupta et al. | 709/224 |
| 6,859,783 | B2 * | 2/2005 | Cogger et al. | 705/10 |
| 7,219,080 | B1 * | 5/2007 | Wagoner et al. | 705/37 |
| 7,542,920 | B1 * | 6/2009 | Lin-Hendel | 705/26 |
| 2002/0038282 | A1 * | 3/2002 | Montgomery | 705/37 |
| 2002/0138393 | A1 * | 9/2002 | Tatge | 705/37 |
| 2002/0165849 | A1 * | 11/2002 | Singh et al. | 707/1 |
| 2003/0041007 | A1 * | 2/2003 | Grey et al. | 705/37 |
| 2005/0120306 | A1 * | 6/2005 | Klassen et al. | 715/765 |
| 2005/0143103 | A1 * | 6/2005 | Bjorgan et al. | 455/466 |
| 2006/0277053 | A1 * | 12/2006 | Lobb et al. | 705/1 |

FOREIGN PATENT DOCUMENTS

| DE | 100 53 246 A1 | 5/2002 |
|---|---|---|
| KR | 2001-0069021 | 7/2001 |
| WO | WO 97/37315 | 10/1997 |

OTHER PUBLICATIONS

Rebecca Day, "Talking without Speaking", http://www.Popularmechanics.com/technology/telecom/1279736.html, XP-002341661, Sep. 10, 2002, pp. 1-5.
Michael Pastore, "Striving for IM 'Presence' In Enterprise Apps", http://www.intranetjournalcom/articles/200308/pij_08_01_03a.html, XP-002341662, Jan. 8, 2003, pp. 1-3.
Michael Schilli, "E-Baywatcher", http://www.linux-magazine.com/issue/39/Perl_Ebay_Auction_Monitoring.pdf, XP-002341663, Feb. 2004, pp. 64-67.
Peter Saint-Andre, "XML Messaging with Jabber", http://www.openp2p.com/lpt/a/413, XP-002341664, Jun. 10, 2000, pp. 1-6.
Beth Cox, "eBay Launches IM Alerts", http://www.instantmessagingplanet.com/public/article.php/994511, XP-002341665, Mar. 20, 2002, pp. 1-2.

* cited by examiner

*Primary Examiner*—Yogesh C Garg
(74) *Attorney, Agent, or Firm*—Oblon, Spivak, McClelland, Maier & Neustadt, L.L.P.

(57) ABSTRACT

By utilizing IMPS technology and transient objects or object identifiers, a method and system can notify registered participants of changes in the status of those transient objects. One use of such technology is in the area of on-line auctions, but other uses include the general area of distributed queuing for an item of interest (or a subject of interest) and dispatching to similarly interested users, through transitive presence, information concerning corresponding transactions or actions.

18 Claims, 13 Drawing Sheets

| Set Criteria | |
|---|---|
| Auction Item: | Television |
| Due Date: | Within 1 week |
| Price Range: | $1-$1000 |
| | $1-$1000 |
| | $1001-$2000 |
| | $2001-$4000 |

Fig. 5

METHOD AND SYSTEM FOR IMPS-BASED TRANSIENT OBJECTS

BACKGROUND OF THE INVENTION

1. Field of the Invention

The present invention relates to a method and system for registering an interest in a subject having dynamically changing characteristics and receiving updates therefor, and in one embodiment, a method and system for registering for updates to an auction item or category in which a consumer has expressed an interest.

2. Discussion of the Background

Various on-line auction systems, such as Wanadoo, uBid and eBay™, support web-based auction systems that enable consumers to bid on items put-up for auction. In such systems, potential purchasers visit a web site and place bids on items of interest. Periodically users check back to see if they are still the highest bidder, and if not, may increase their bid if they want to outbid the current highest bidder. However, such a mechanism is cumbersome in that it is up to the user to determine when they are no longer the highest bidder.

As described in Chapter 7 of mobile messaging: technologies and services: SMS, EMS and MMS, by Le Bodic, ISBN 0-470-84876-6 (2003), incorporated herein by reference, another recently developed technology is Immediate Messaging and Presence Services (IMPS) (proposed by Wireless Village) which includes Instant Messaging and Presence Protocol (IMPP) and variants such as APEX, PRIM, SIP/SIMPLE, XMPP, AOL IM, AIM, Yahoo, Wanadoo & MSN Messenger. Using IMPS technology, people can sign up to send messages to other participants on a list of known participants (or buddies). People can be added to conversations by selecting their corresponding name(s), email address(es) or instant messaging address(es) from a list or via manually inputting the appropriate information. Such addresses are generally considered to be references to people and are thus valid for a long period of time and may be considered persistent identifiers (as opposed to transient identifiers). IMPS technology has been the subject of various Internet Engineering Task Force (IETF) publications including, but not limited to: Common Presence and Instant Messaging: Message Format, Presence Information Data Format (PIDF), Address Resolution for Instant Messaging and Presence, Common Profile for Presence (CPP), Common Profile for Instant Messaging (CPIM), as well as several Requests for Comments, including: A Model for Presence and Instant Messaging (RFC 2778), Instant Messaging/Presence Protocol Requirements (RFC 2779), and Date and Time on the Internet: Timestamps (RFC 3339). The contents of each of those IETF publications and RFCs is incorporated herein by reference. As used herein, "Immediate Messaging and Presence Services communications protocols" or "IMPS communications protocols" will be used to collectively refer to the communications protocols described above.

SUMMARY OF THE INVENTION

It is against this background that a method and system according to the present invention has been developed. By utilizing IMPS technology and transient objects or object identifiers, a method and system can notify registered participants of changes in the status of those transient objects. One use of such technology is in the area of on-line auctions, but the present invention is generally directed to the area of distributed queuing for an item of interest (or a subject of interest) and dispatching to similarly interested users, through transitive presence, information concerning corresponding transactions or actions.

Thus, it is an object of the present invention to provide a method and system for creating transient objects that represent items or subjects of interest whose importance is time-limited. By registering to be notified of changes in the object of interest, a communications system can "push" information about the changes to the registered users rather than requiring the users to periodically re-request information.

With respect to an additional feature of the invention, a service can send association control commands with a transient object that will allow a user to act on the item.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where:

FIG. 5 is an exemplary filter for specifying transient objects of interest (e.g., an auction item) for which a participant would like to receive status updates;

DETAILED DESCRIPTION OF THE PREFERRED EMBODIMENTS

Figure 1:
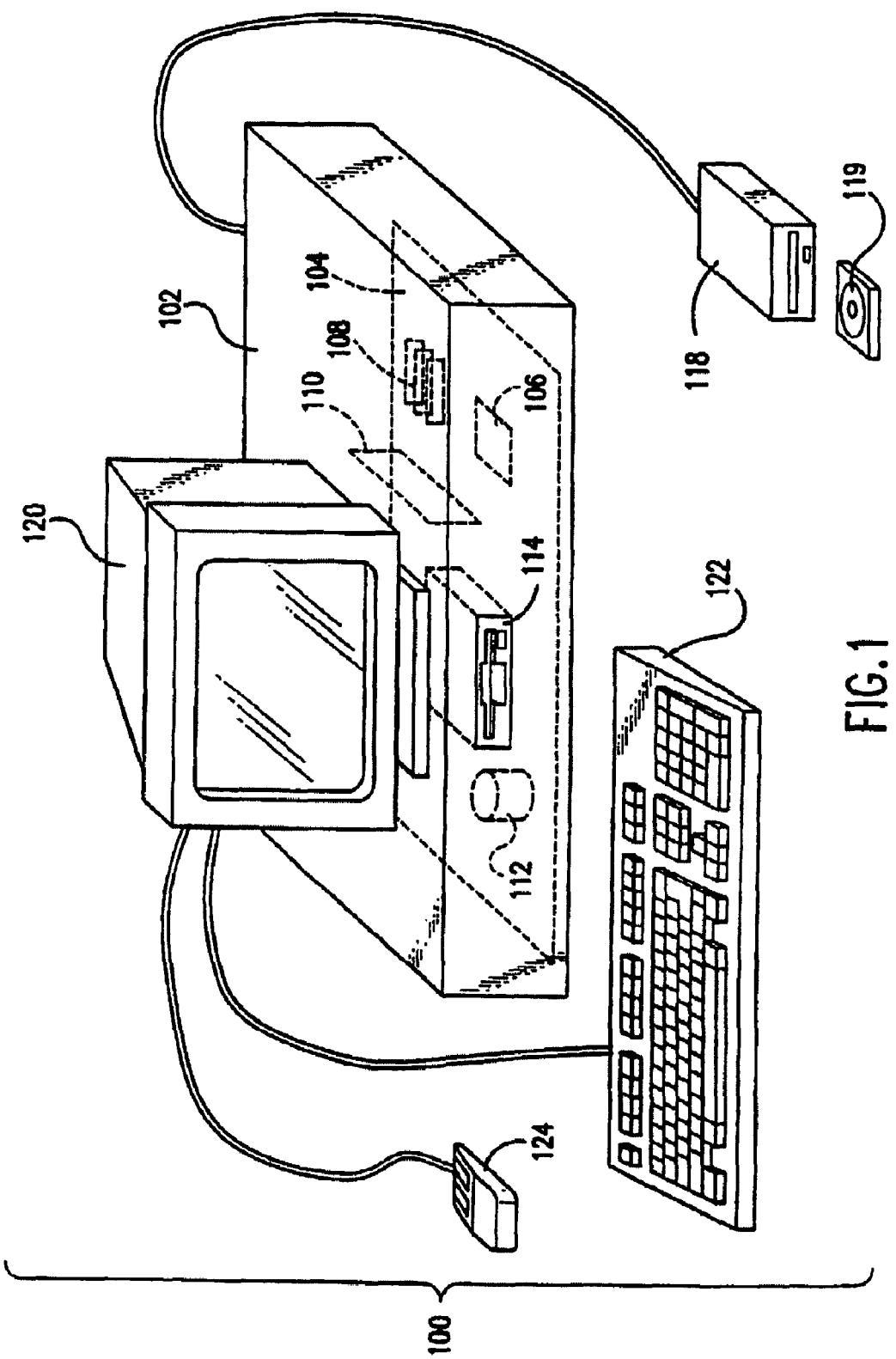
FIG. 1 is a schematic illustration of a computer for implementing at least a portion of the present invention.

Referring now to the drawings, wherein like reference numerals designate identical or corresponding parts throughout the several views, FIG. 1 is a schematic illustration of a computer system for implementing, in one embodiment, a portion of the present invention. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of transient objects of interest.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Together, the computer readable media and the software thereon form a computer program product of the present invention for notifying a plurality of recipients in parallel about changes in objects represented as buddies or participants in IMPS communications. The computer code devices of the present invention can be any interpreted or executable code mechanism, including but not limited to scripts, interpreters, dynamic link libraries, Java classes, and complete executable programs. Moreover, the computer code devices of the present invention need not be co-resident and may instead be physically separate and communicate with each other. Such communications may be via either physically linked communication (e.g., over serial or USB connections) or may be via indirect communications (e.g., using packet-based communications where addressing is used to identify the destination (and potentially source) of the communication). Examples of packet based communications include TCP/IP, UDP/IP, and Reliable Datagram Protocol (RDP). Such communications may be over any communications adapter, including, but not limited to, Ethernet, Token-ring, ATM, and FDDI.

As would be appreciated by one of ordinary skill in the art, the present invention need not be implemented on a general purpose computer, but may instead be implemented on any hand-held or fixed (e.g., desktop) device. Examples of such devices include PDAs, mobile and/or smart phones and custom-designed IMPS devices, such as IMFree by Motorola.

Figure 2:
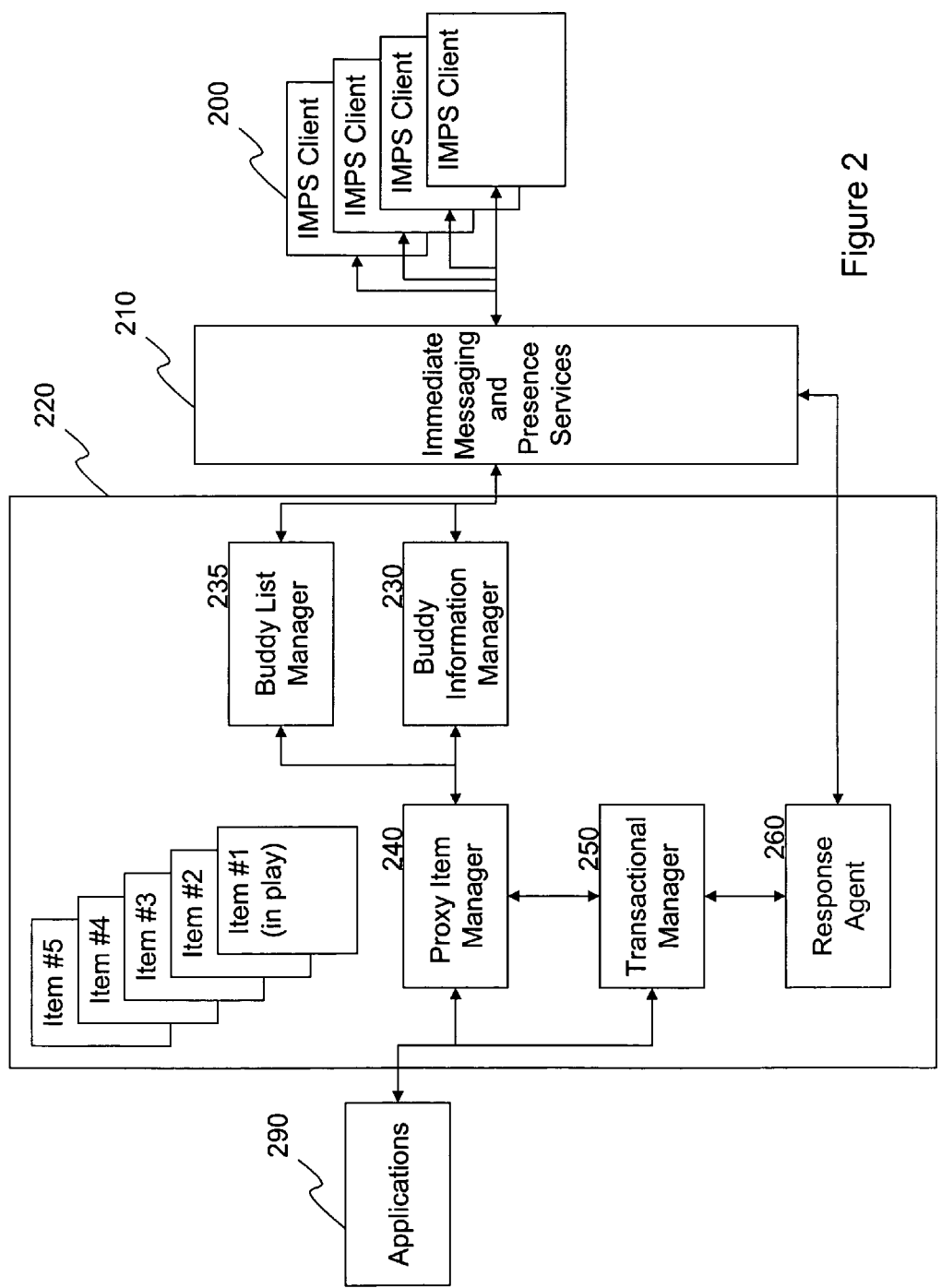
FIG. 2 is a schematic illustration of exemplary components providing portions of functionality according to various aspects of the present invention.

Turning now to FIG. 2, various components of several aspects of the present invention are illustrated. Not all of the components of FIG. 2 (or any other figure herein) need be practiced together, and various sub-systems may be separately patentable herein. In the exemplary embodiment, various IMPS clients 200 communicate via any available IMPS platform 210. The IMPS platform 210 communicates with the transient object messaging and control system 220 which may interact with various back-end applications 290 which provide information on various transient objects under the control of the system 220. As used herein, transient objects are defined to mean objects having short-term lives. An example of a short-term life is the time period of an auction such that the object only exists while an item is available for bids. Similarly, in the case of an object representing an incoming call in a call center, the transient object only exists for the duration of the call.

Within the transient object messaging and control system 220, information on the existence and state of transient objects is maintained to present the transient objects to participants through an IMPS interface. When a new item is to be made available in an auction environment, the application 290 interacts with the proxy item manager 240, and the proxy item manager 240 requests the buddy list manager 235 to add a transient object (representing the auction item) as a buddy to at least one user's list of buddies. The proxy item manager 240 also requests that the buddy list manager 235 remove the transient object (representing the auction item) from a list of buddies when an item is no longer available (e.g., when an auction has closed). In this way, the transient object only appears on the participant's list during specified activities or time periods (i.e., while the transient object is being managed by the system). Internally, the system may manage groups or sets of transient objects as lists, arrays or any other data structure. Such groups or sets may be either ordered or unordered, depending on the application's requirements. Moreover, according to application specific rules, a buddy list manager 235 may place additional conditions on transient objects (e.g., provide rules for adding/deleting transient objects to the system). The transient objects are generally distributed objects which generally appear on an IMPS client and for which distributed actors can cause status updates to been seen by other distributed actors within the system.

The buddy list manager 235 manages the buddy list for a user and accepts requests from the proxy item manager 240 to add or remove entries from the list of buddies. This buddy list manager 235 also checks for the policy settings of the user before adding a transient object/buddy and any user requests to remove/add a transient object/buddy. A participant may become the owner of a transient object based on a series of application-specific rules (e.g., by becoming the highest bidder in an auction or by being first to answer a call in a call center). In the case of an auction, management of the ownership of the object may implemented using a "compete model" of queuing where users "compete" (by bidding) to be an owner of an object.

The transient object application 290 maintains a record of the items (e.g., by storing the items in a memory structure such as a queue, list or array) and relays the information about the items to the buddy list manager 235. The buddy list manager 235 adds a buddy to the user's buddy list for new objects of interest to the user items or deletes the transient buddy if the items are removed.

The buddy information manager 230 manages the information content associated with a transient buddy and usually describes the item added and/or removed by the requesting application 290. This will typically include information displayed as a status of the buddy. The buddy information manager also sends the control message commands to the user as the state of the item changes.

Generally, the response agent 260 handles any response (received via the IMPS technology) from the user. It then forwards the response to the transactional manager. The transactional manager 260 maintains the transactional integrity of the item. It ensures that only one response (e.g., the first response or the response from the highest priority user) is accepted after validating the response.

Figure 3A:
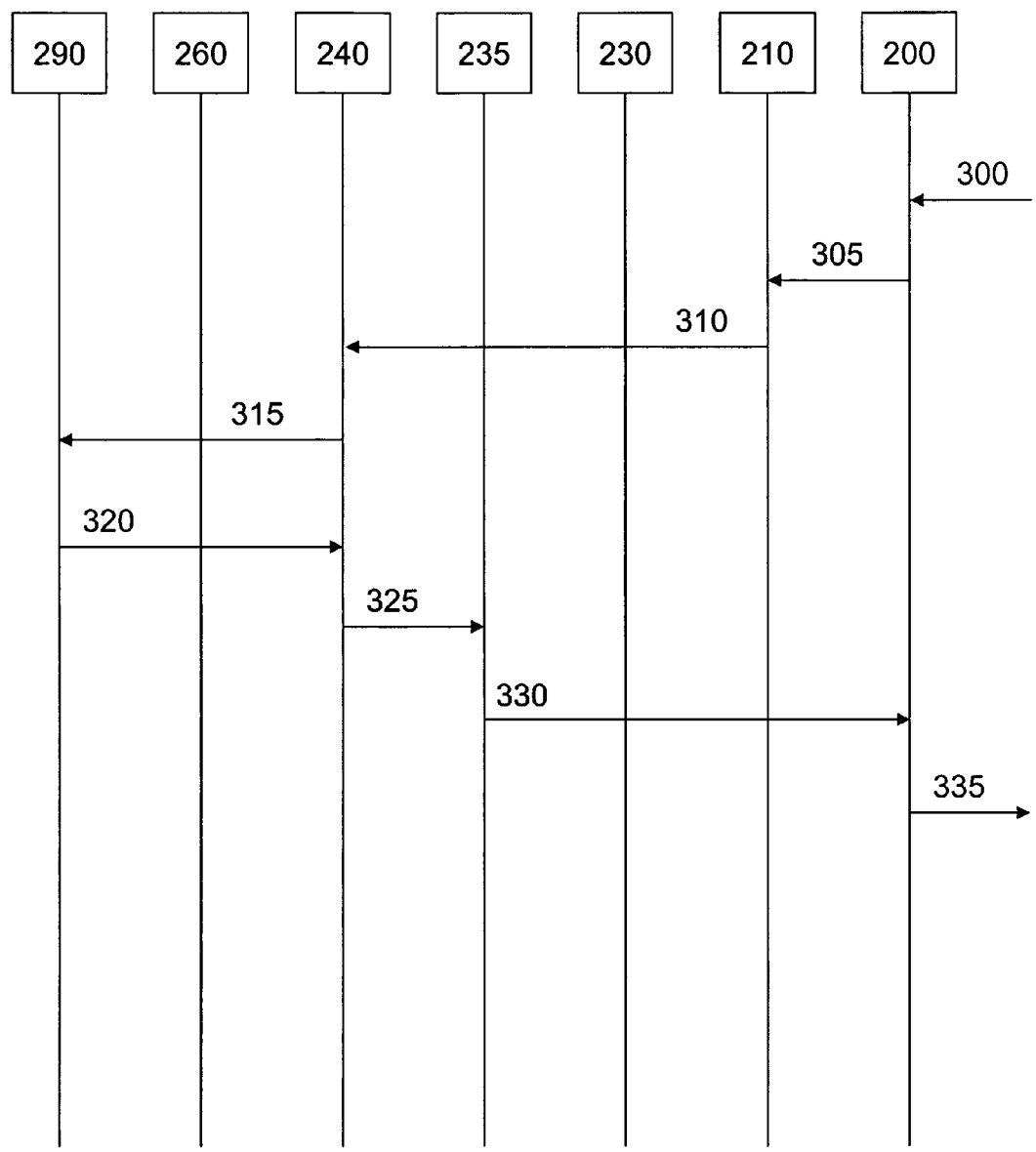
FIG. 3A is a flowchart showing a high-level view of a process of finding auction items for sale utilizing IMPS technology utilizing the exemplary components of FIG. 2.

As shown in FIGS. 3A-3D, a variety of messages can be exchanged between the components of the exemplary embodiment of FIG. 2. As shown in FIG. 3A, a user that wishes to see auction items related to TV's can utilize an interaction 300 (e.g., a mouse click or text entry) to cause the user's client 200 to send a message 305 to the IMPS system 210. The IMPS system 210 then processes the message 305 and the message 310 on to the proxy item manager 240. As with all message forwarding described herein, the messages 305 and 310 need not be in the same format even though the message is "forwarded." In fact, a message recipient component that "forwards" a message, as described herein, may remove or add some information before passing the message on to its next intended recipient component.

Depending on the type of request is received in the message 310, the proxy item manager 240 may either handle the request itself (e.g., when the request is for an item already known to and managed by the proxy item manager) or it may pass the request on to the backend auction application 290 for further processing on the request (e.g., for returning a list of items or categories that correspond to a request for information). In the illustrated message sequence of FIG. 3A, the proxy item manager 240 forwards on a message 315 to the auction application 290 requesting that the user be provided with information identifying those categories that correspond to the keyword "TV." In response, the application 290 returns a message (or messages) 320 containing the categories matching "TV" to the proxy item manager 240. The item manager 240 then forwards a message 325 to the buddy list manager 235 requesting that the buddy list manager 235 add the corresponding categories to the user's buddy list. The buddy list manager 235 then sends a message 330 to the IMPS client 200 providing the categories to that can now be displayed in response to the interaction 300. The display of at least a portion of the returned information is shown as an output 335.

Figure 3B:
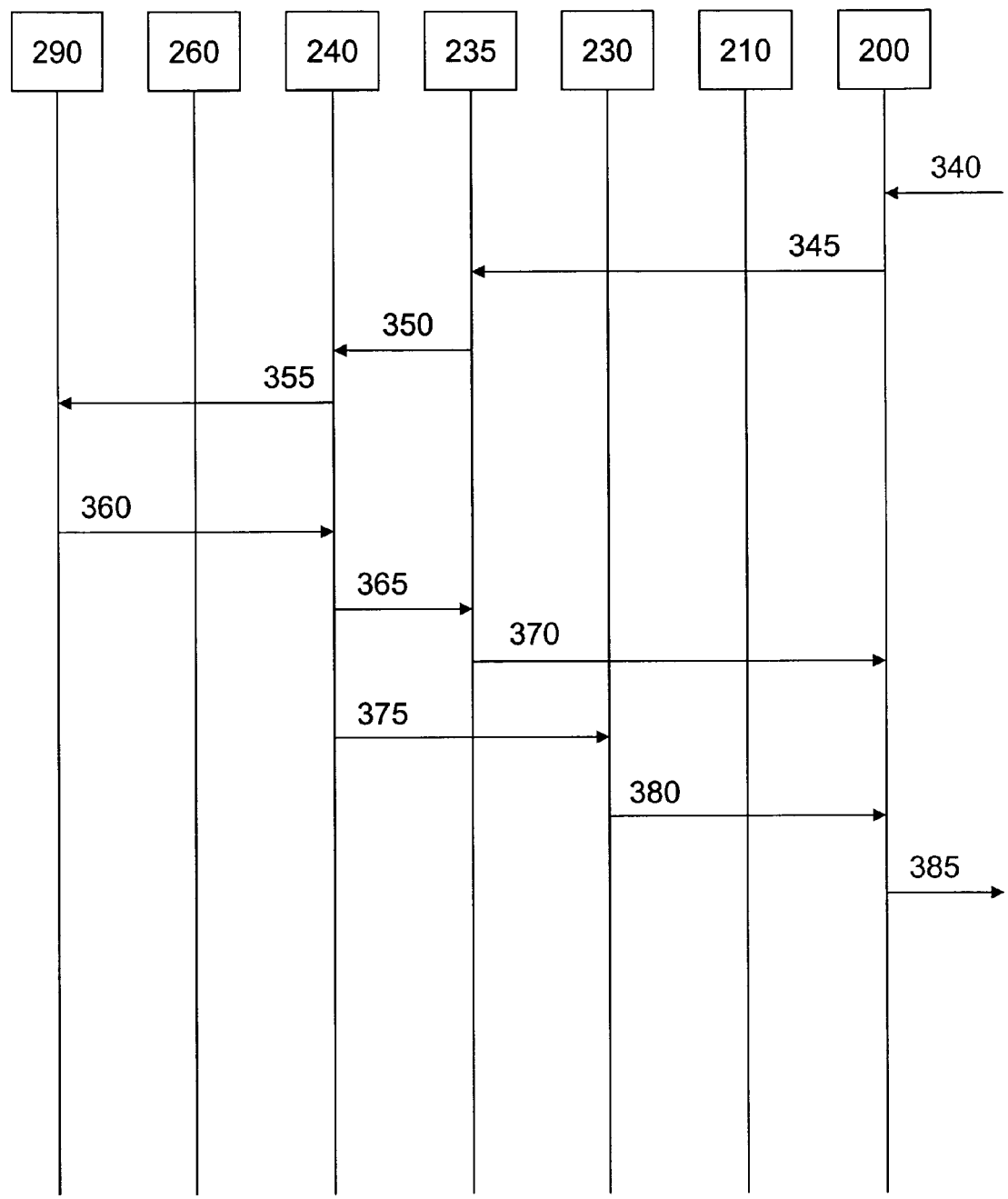
FIG. 3B is a flowchart showing a high-level view of a process of registering that an item is of interest utilizing IMPS technology.

As shown in FIG. 3B, having displayed at least a portion of the returned information from FIG. 3A, a user may interact with that information (or other information) using an interaction 340. This may involve "drilling down" on the returned information by selecting a series of increasingly specific choices until a user has found an item (or category) of interest. For example, the user interacts (340) with the IMPS client 200 to request that "digital televisions" corresponding to the returned results of the "TV" request (of FIG. 3A) be added as buddies (or items) in the user's buddy list. To achieve this, the IMPS client 200 sends a message 345 to the buddy list manager 235 (implicitly by way of the IMPS system 210). The buddy list manager 235 requests (350) from the proxy item manager 240 items corresponding to the "digital television" request. Those items may either be already managed by the proxy item manager 240 or may be obtained by communicating (355/360) with the auction application 290. For items being managed by the proxy item manager 240 (including those obtained in the communication 360), the proxy item manager 240 requests (365) that the buddy list manager 235 add those items to the user's buddy list. The buddy list manager 235 then communicates (370) to the client 200 the new items (for display or selection 385). In addition, the proxy item manager 240 interacts (375) with the buddy information manager 230 to generate any menu items (e.g., place bid, cancel bid or unregister for item) or state information (e.g., current bid, time until auction close) corresponding to the new items. The buddy information manager 230 then communicates (380) with the client 200 the corresponding commands for the items as well as any item information as a presence message using the IMPS technology.

Figure 3C:
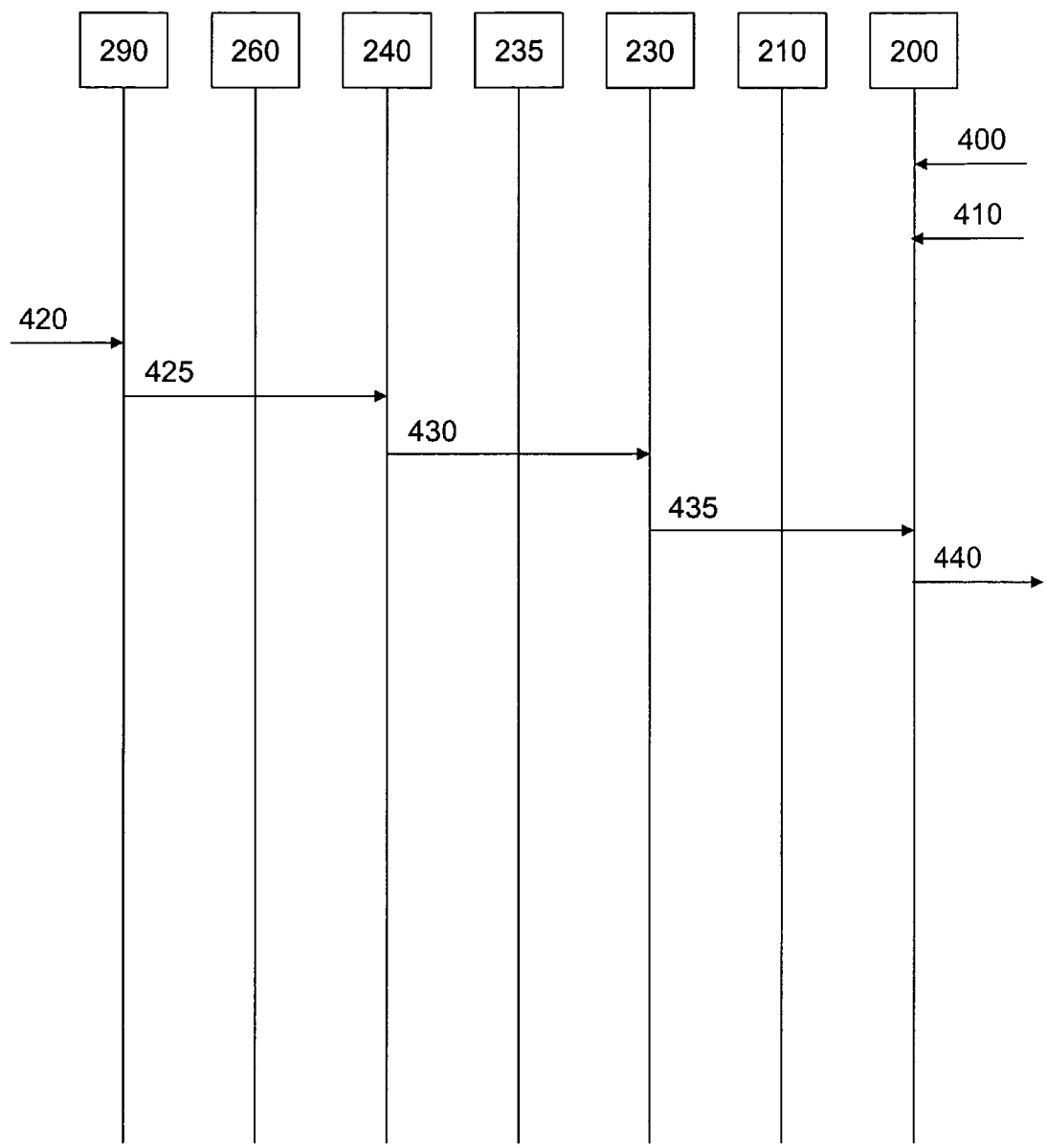
FIG. 3C is a flowchart showing a high-level view of processes for displaying changes in the state of registered items of interest utilizing IMPS technology (e.g., using presence messages)

As shown in FIG. 3C, once an IMPS client 200 is monitoring at least one auction, the user may interact (400) with the client 200 to see menu items (e.g., by right clicking on a listed item) corresponding to actions that can be performed on the selected item. Also, a user may obtain information about an item by interaction (410) with an item, e.g., "hovering over" or "mousing over" the item with a mouse (or other input device).

The backend auction application 290 may also generate messages destined for the IMPS clients 200 autonomously. For example, in response to an auction participant interacting (420) with the backend application 290 to increase a bid (via a web interface, a telephone interface or an IMPS interface), the backend auction application 290 notifies (425) the proxy item manager 240. This in turn causes the proxy item manager 240 to notify (430) the buddy information manager 230 of the change. This notification (435) is then propagated to the IMPS clients 200 that have the associated object listed as a buddy that the state of the associated object has changed, as shown in FIG. 3C. The user can then interact (440) with the IMPS client 200 to see that change.

While FIG. 3C has been described above with reference to an external user performing an action (e.g., chainging a bid), actions may also be performed autonomously by the application 290. For example, the application 290 may signal that an item has been bought at its "Buy now" price or the auction may have closed. In either case, the auction is marked as no longer available for bids, and the proxy item manager 240 is notified that the item should be dequeued (or otherwise removed form the list of items to be managed). Such a change in the status of the item is also communicated to the IMPS client 200 and eventually the user.

Figure 3D:
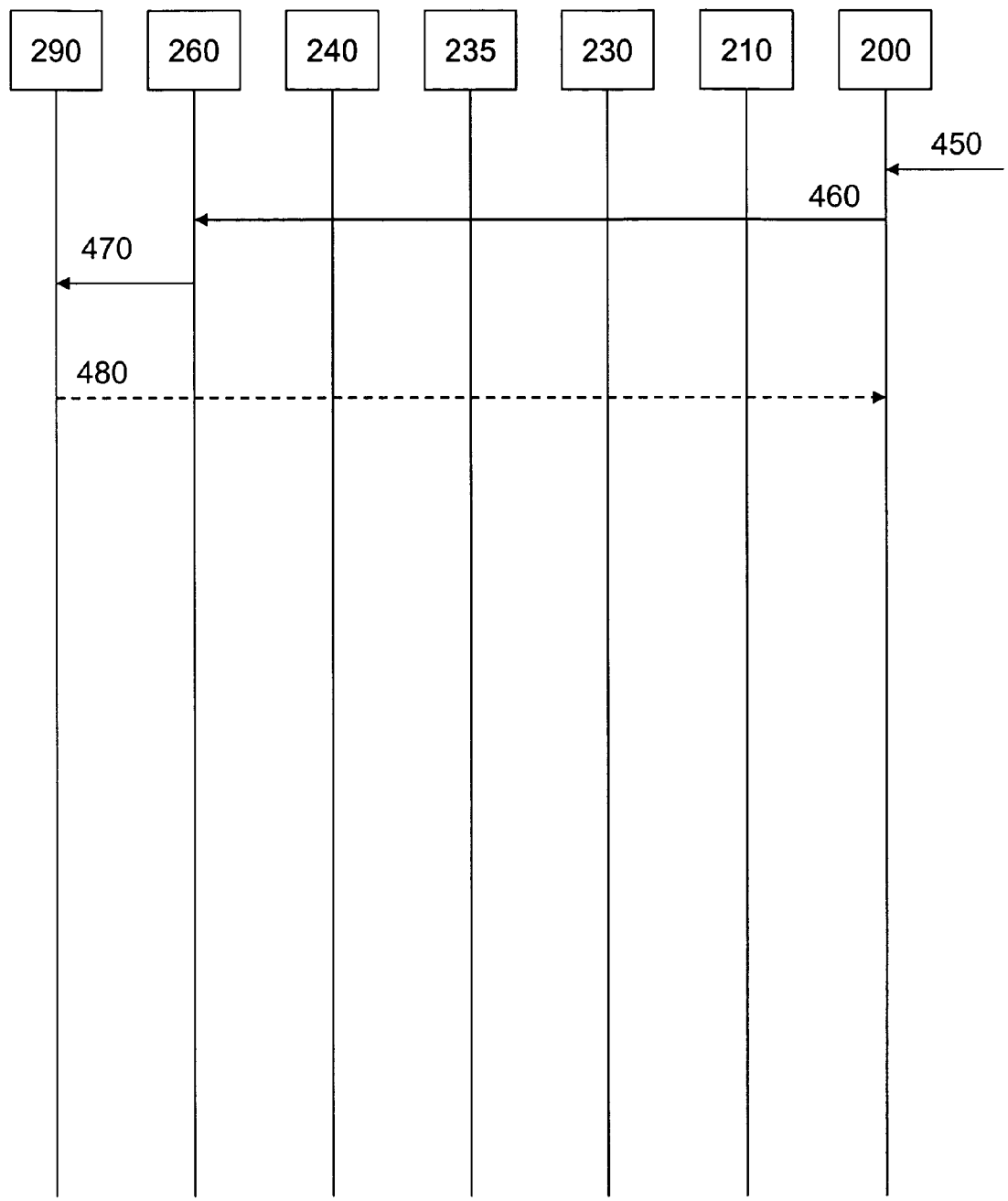
FIG. 3D is a flowchart showing a high-level view of processes for changing the state of registered items of interest utilizing IMPS technology (e.g., using presence messages)

As shown in FIG. 3D, the response agent 260 handles any requests (450) (e.g., requests to change a bid) from the user (via the IMPS technology) that require transactional support. The transactional manager 260 maintains the transactional integrity of items (e.g., it ensures that only one response (for example, the first response or the response from the highest priority user) is accepted after validating the request). Requests 450 are then forwarded on to the application 290 in charge of those requests.

Depending on the type of request, information (480) may be sent back to the IMPS client 200 reflecting the results of the request. For example, a user may be notified that it now has the "ownership bid" representing the highest bid on the item.

In order to facilitate the communications described above with respect to FIGS. 3A-3D, the system may utilize any number of message formats. In one exemplary (but not limiting) embodiment of the present invention, XML-based messages are used for at least a portion of the message exchanges. For example, in response to the bid placement illustrated with reference to FIG. 8, the system may generate an XML formatted message:
<bid to="phone1@a1234.com"><amount>300.0</amount></bid>.

In the event of a change in the highest bidder, the system may generate an exemplary Presence XML tag in the form of:
<presence to="user@localhost" from="phone1@a1234.com">
<show>outbidded</show><status>You have been outbidded</status>
<highestbidder>srini</highestbidder><bidamount>400.0</bidamount></presence>

Similar to an Add Contact function, an "Add Auction Item" request may generate an exemplary XML tag such as:
<presence to="phone2@a1234.com" type="subscribe"></presence>
<iq type="set"><query xmlns="jabber:iq:roster">
<item jid="phone2@auctionplace" name="phone2" ask="subscribe"><group>Auction Items</group></item>
</query></iq>.

<iq>tags are generally for querying and sending the information between Servers and Clients. Lastly, an exemplary XML tag for a Sell Item request may be:
<iq="sell"><query xmlns="jabber:iq:roster"><item jid="phone3@a1234.com" name="phone3" initialprice="320.0" buynowprice="400.0" ask="subscribe"><group>Sell Items</group></item>
</query></iq>

Utilizing the system 220 of the present invention, various types of objects can be treated as buddies. As described above, items up for auction can be treated as buddies, but other objects such as incoming calls can also be treated as buddies. In the auction example, various participants may be "in charge" of the object for a period of time as those participants are the current highest bidders for the corresponding period. However, in the case of managing incoming calls (e.g., at a call center), one participant may become the owner of the object (i.e., the call) for the lifetime of the object. In the second case, participants that are not "in charge" of an object may either have that object removed from their buddy list altogether or may simply see a reduction in the types of functions which they can perform on the corresponding object.

Figure 4:
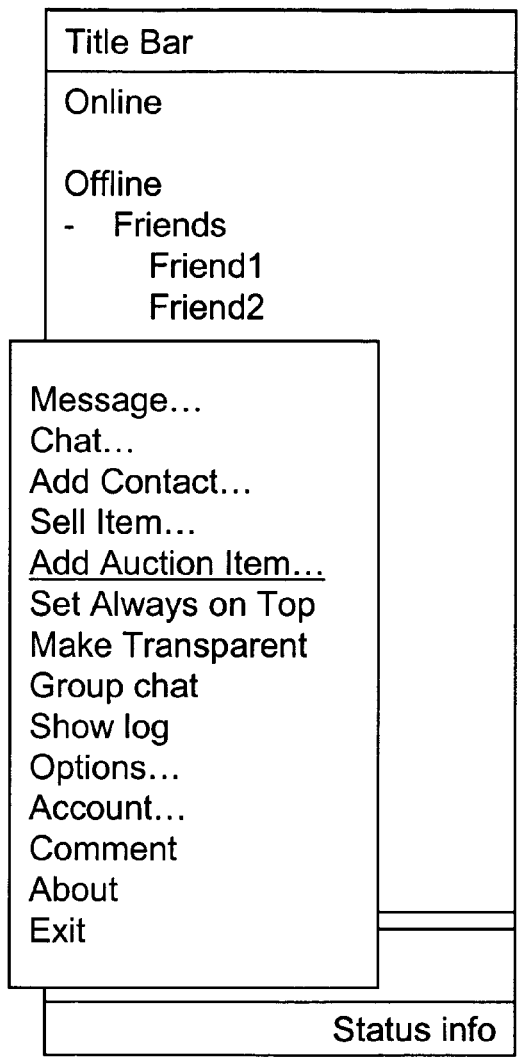
FIG. 4 is an exemplary user interface (including a context sensitive menu) for adding an auction item to a list of registered, transient objects of interest.

Returning to the example of an auction, as shown in FIG. 4, an IMPS interface may include a menu system (e.g., a context sensitive menu system) that enables a user to add not only contacts but also auction items. In response to the "Add Auction item . . . " entry (of FIG. 4) being selected, an interface, such as the one shown in FIG. 5, may be displayed to a participant in order to allow the participant to further specify what type of auction items are of interest. In the example of FIG. 5, the participant specifies a filter so that items to choose from include televisions that can be delivered "Within 1 week" and that are in the price range of $1 to $1000. Alternatively, the price and delivery time could have been left unspecified in order to obtain a list of all televisions.

In response to the information about the item being entered, using a series of messages, the IMPS client 200 sends via the IMPS platform 210 a request to the buddy information manager, and the information is then sent to the proxy item manager to determine (either by consultation with the records of the proxy item manager or the information of the auction application 290) if there is an auction item matching the conditions (i.e., the filter) specified by the participant. If so, the information regarding the matching item is transferred back to the participant. This information may be in the form of a list from which the participant may choose.

Figure 6:
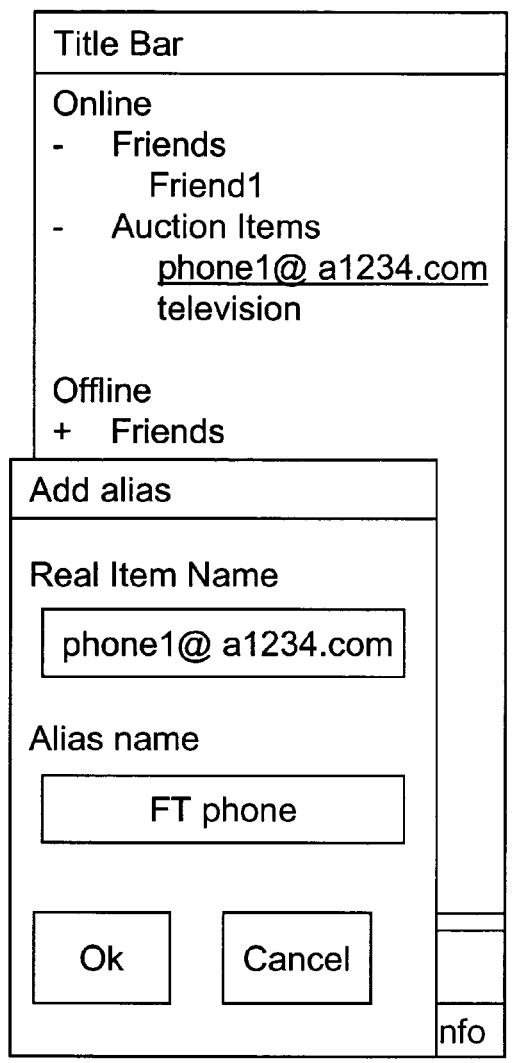
FIG. 6 is an exemplary user interface for adding an auction item as a transient object of interest that a participant would like to receive notices about.

As shown in FIG. 6, an interface may also be provided by which a participant may add additional information corresponding to the item found. For example, if the IMPS client selected a matching item having the transient name "phone1@a1234.com", then the participant may add a more recognizable name to the transient name (e.g., "FT phone") and place it in a preferred group (e.g., "Auction items"). This enables the user to more intuitively deal with the potentially numerous outstanding auction items on which he/she has bids or is interested.

Figure 7:
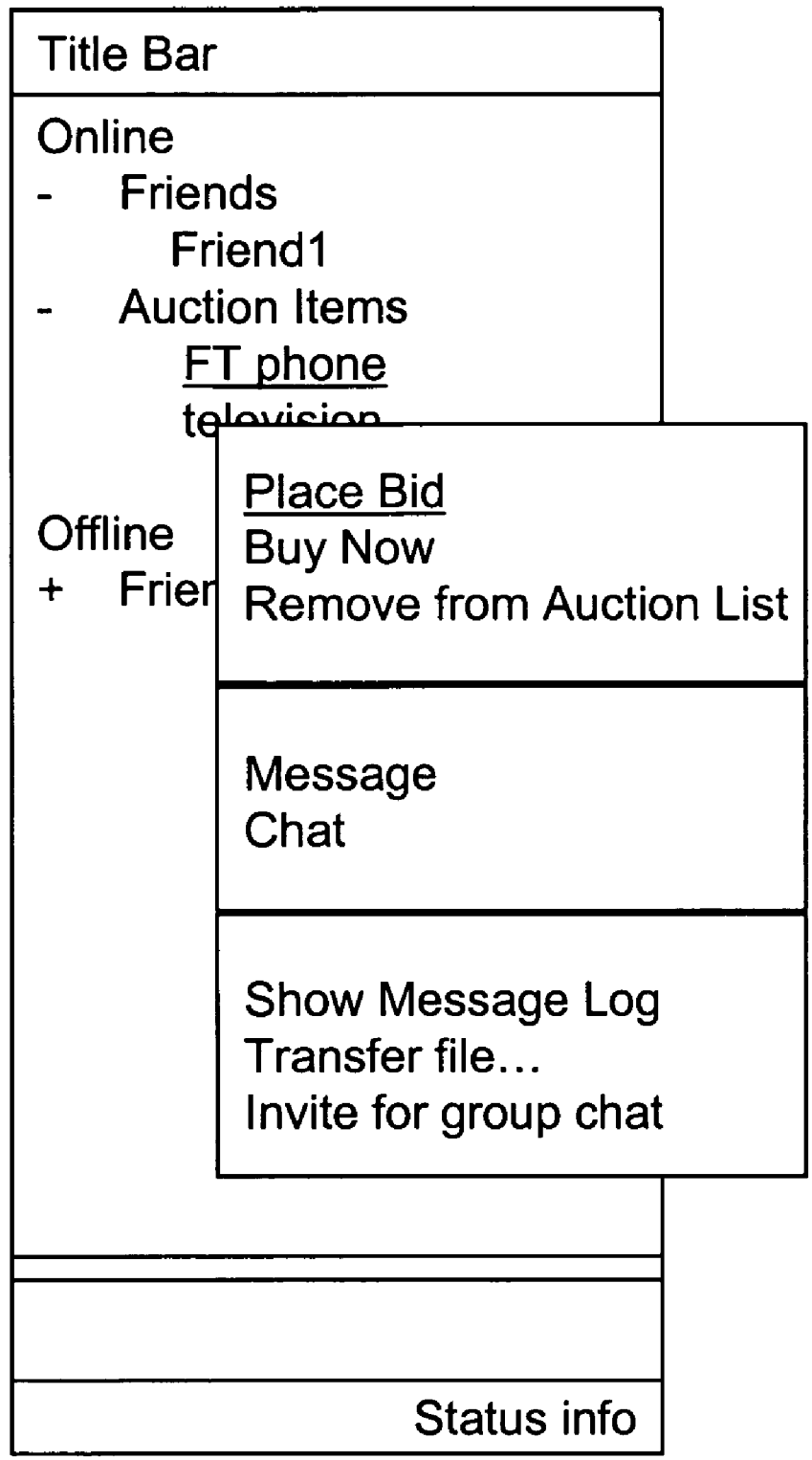
FIG. 7 is an exemplary user interface for requesting to place a bid on an auction item acting as a transient object of interest.

Once an item has been added as a transient object or buddy, the IMPS client 200 may allow further context sensitive information. For example, by right clicking on an item that is still part of an open auction, the participant may be given an interface such as that shown in FIG. 7. Such an exemplary interface allows a user to (1) place a bid, (2) buy the item outright at its "sale" price, and (3) remove the item from the list of transient objects being monitored on behalf of the participant. The same interface may also allow the participant to send traditional messages or chat with other participants using IMPS messaging.

Figure 8:
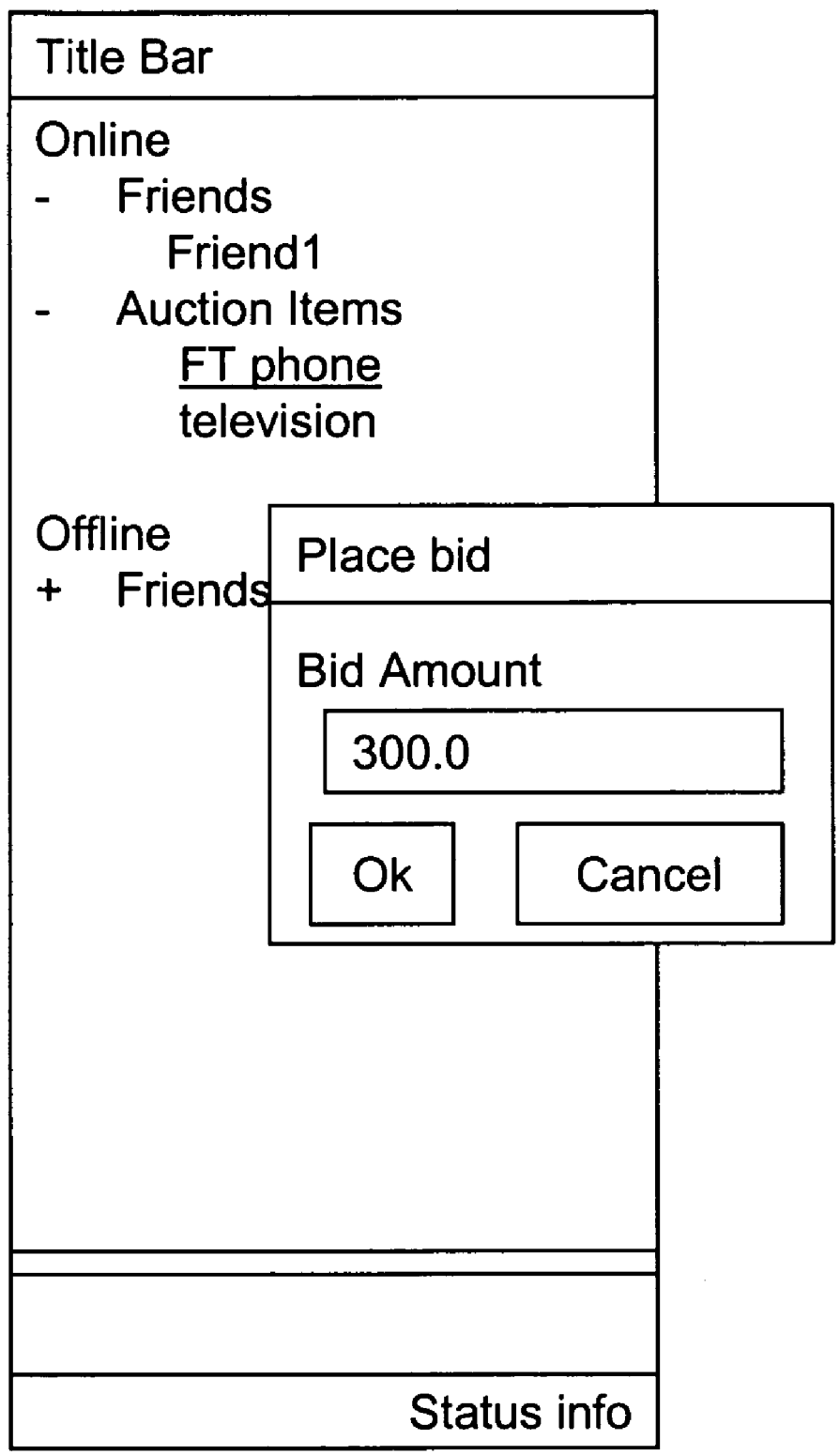
FIG. 8 is an exemplary user interface for placing a bid on an auction item acting as a transient object of interest.

If the participant was to select that it wished to place a bid, an interface such as the one shown in FIG. 8 may be presented to it. This enables the bid to be communicated via IMPS messaging to the auction application 290 which then communicates the change to all the registered participants for that item.

Figure 9:
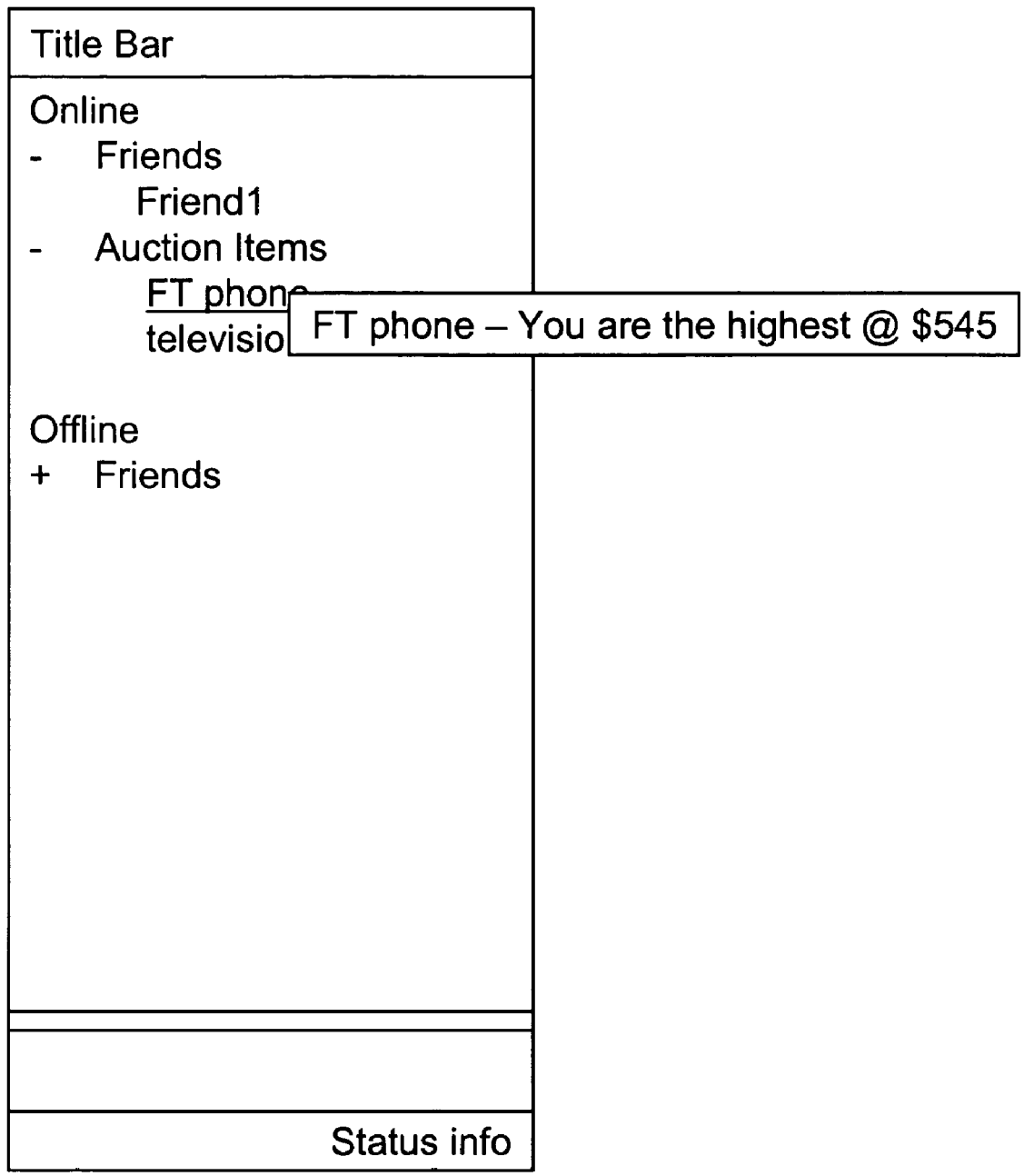
FIG. 9 is an exemplary user interface for receiving bid information on an auction item acting as a transient object of interest according to a first embodiment of displaying the bid information.
Figure 10:
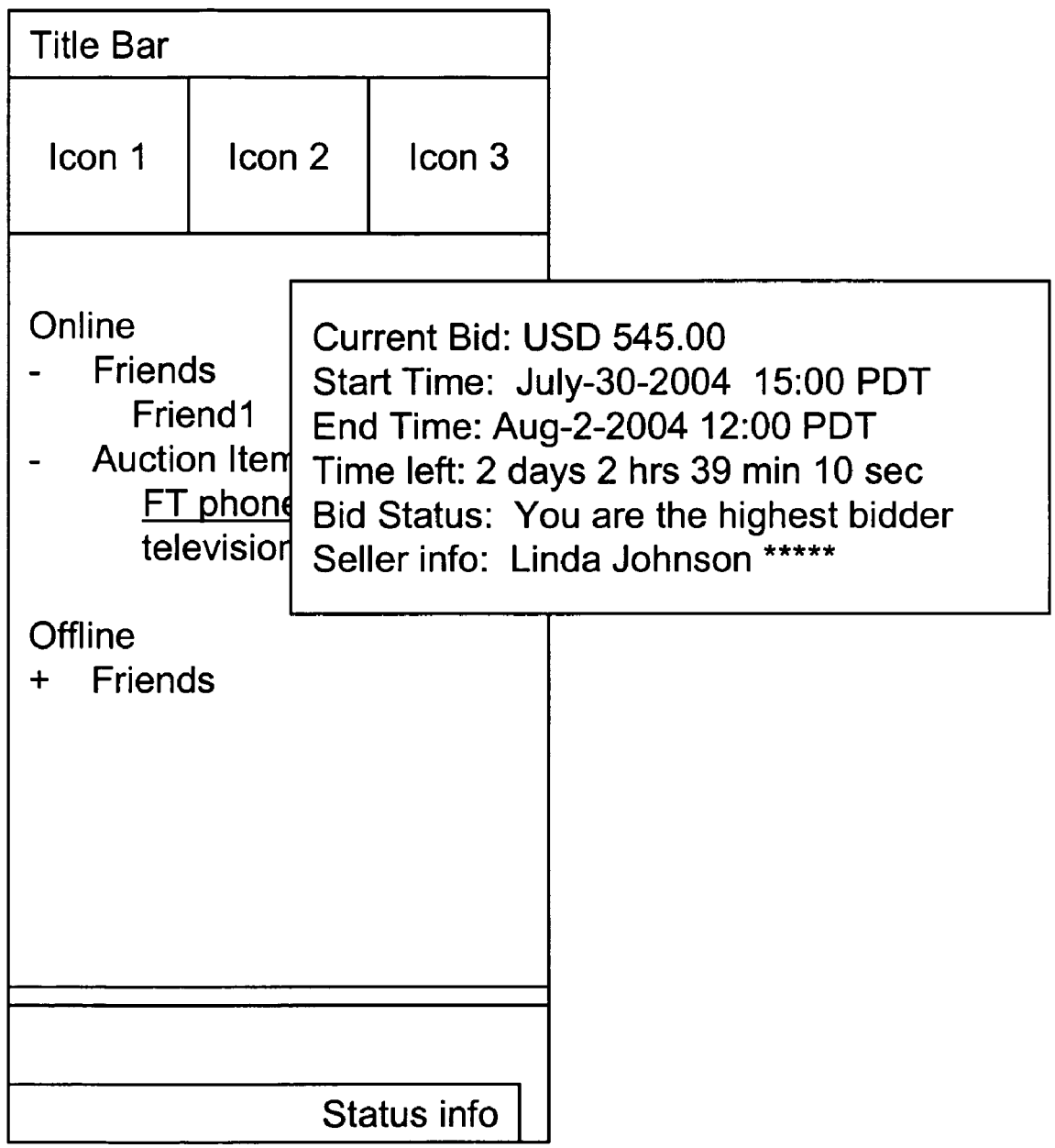
FIG. 10 is an exemplary user interface for receiving bid information on an auction item acting as a transient object of interest according to a second embodiment of displaying the bid information.

If a participant wishes to obtain information on the current state of an auction, the participant may simply "mouse over" the corresponding item in its buddy list. The information may then be shown in a pop-up, such as is shown in FIGS. 9 and 10. (It is noted that FIGS. 10 and 11 also show that the user interface can include additional controls thereon, such as pushbuttons with either text, graphics or both thereon. Such pushbuttons may implement commonly used functions (generating a pop-up to send a message or add a new item or user) without having to utilize context sensitive menus.)

Figure 11:
FIG. 11 is a screenshot of an exemplary user interface for deleting an auction item acting as a transient object of interest from a participant's list of objects of interest.

As described above with respect to FIG. 7, using an interface such as shown in FIG. 11, a participant may also select to remove an auction item from its list of transient objects being monitored. In such a case, the IMPS messaging system 210 informs the proxy item manager to remove the item from the participant's buddylist.

As described above, the system of the present invention utilizes IMPS messaging to contact all participants about a transient object (e.g., representing an auction item) when the status of the transient object changes. For example, when participant$_1$ is currently a highest bidder for an auction item that participants$_{1-3}$ wish to bid on (and therefore have in their buddy lists), participants may elect to place a bid on the item and become the new highest bidder. Since IMPS messaging is used, participant$_1$ and participant$_3$ are immediately notified of the change, e.g., by changing a color of the text or graphic in the buddy list that represents the corresponding item, based on information "pushed" to them (as opposed to pulling down additional data from a web-server at the request of the web client). Either of those users may then "mouse over" the item to determine its new status (e.g., the new highest bid and who has placed it). After successful placement of the bid the user becomes the owner for this "item" (e.g., as indicated by a change of presence indication) until he/she is out bided by others. At the same time the "item" presence status of the previous owner will change to "outbid".

In response to being outbid, either of the other participants may increase their bids (e.g., by at least a fixed bid increment size) manually or they may have established an agent internal to the IMPS client (or working in conjunction with the IMPS client) that automatically increases the participants bid according to an established set of rules (e.g., up to a specified maximum). This automatic bid changing can be done at either the IMPS client or at a proxy identified by the IMPS client.

As described briefly above, the present invention may be utilized for technical areas other than auctions. For example, call centers that utilize problem tickets may also benefit from the present invention by treating those problem tickets as transient objects. In such a case, the trouble ticket is added to the buddy lists of customer service agents having the qualifications needed to address the ticket. Thus, the present invention may utilize filtering when establishing the addition of buddies to a buddy list. In such a case, the auction application 290 would be replaced by (or supplemented by) a trouble ticket application 290'. In that embodiment, the trouble ticket application 290' identifies the group of users who can handle the problem ticket and dispatches to the proxy item manager the problem ticket item and the corresponding list of buddies. The proxy item manager manages the process of adding a transient buddy to the selected users and passing information about the problem to the buddy information manager. Users A, B and C see the problem item appear as a buddy in their worklist group of buddies. User A right hovers on the problem ticket buddy to see the description displayed by the buddy information manager. He then creates an IM session to get detailed description about the problem or enters a command to own the transaction. The problem ticket item will be removed from the User B & User C and the User A can handle the problem through the IM client.

In order to provide a flexible, context-specific interface, the present invention further provides a messaging protocol that provides to the IMPS client 200 information about the context-specific menu items that a user is monitoring. For example, rather than building an interface that is auction-specific, the system may send from the application to the IMPS client 200 context menus that vary depending on the type of object and/or the relationship between the object and the participant. In the context of an auction item for which a participant is already the highest bidder, the present invention may inform the IMPS client 200 that it is to remove (or show as deactivated) the "bid" or "increase bid" menu item. Similarly, if an item does not have a "sale" price that will enable it to be purchased outright at any point, then that option is not provided to the IMPS client 200.

The information to be prompted for when a menu item is selected may also be specified from the application to the IMPS client 200. In one embodiment of this aspect of the invention, a form description language (e.g., like that used in Web interfaces) may be used to specify the fields and their corresponding labels which are shown to the participant in response to the selection of a menu item (like a response would occur to a selection of a web page).

Using the same dynamically generated interface, the present invention can also provide dynamic list displays. By specifying a hierarchy of information that matches a query sent to it by a IMPS client, an IMPS client can build a navigatable list of possible matching entries. For example, by searching on "televisions", rather than providing an unsorted list of all entries matching "televisions", the IMPS client could be provided with lists entitled "by name", by "type", and "by price range". Each of those categories would then contain main groups with sub-groups and/or items. For example, the "by name" entry may include associated therewith "Sony" and "Toshiba" as the names of manufacturers, while the "by type" may include "plasma" and "projection" as groups. However, the "by name" and "by type" lists may include overlap since there may be plasma TVs by both Toshiba and Sony. In this way, the user can open portions of the hierarchy without having the clutter of an unsorted list. Also, the data can be grouped logically, thereby enabling the user to understand the results of the query quickly.

A participant may also utilize existing web interfaces to identify that it is interested in a particular transient object (e.g., auction item). In the case of an auction, an auction provider may include an IMPS interface control (e.g., a push button on a Web interface showing an available auction) which, when activated, prompts the participant to enter its IMPS messaging id. Using the information about the object that was associated with the interface control and the IMPS messaging id, the auction provider may inform the auction application 290 and thereby register the participant as interested in that object.

In yet another embodiment, the participant's IMPS messaging id may be included in the participant's information stored with the auction provider. In this way, when a participant logs onto an auction web site, its IMPS messaging id may immediately be known to the auction system. Thus, when a user activates a corresponding interface control to track an object or bid on an object, the auction provider can again notify the auction application 290 to enable the auction item to appear as a transient buddy to the participant.

While auctions and call centers have been described hereinabove with respect to person-to-person communication and collaboration, the present invention is similarly applicable to shopping, supply chain management, interactive gaming, field support, Sales force automation, Sales force/CRM, and fleet management, as well as other fields. For example, in a supply chain environment, manufacturing parts requisitions in an inventory system could appear as a buddy in the supplier's console and a supplier can take ownership of the requisition depending on the supply chain business rules (e.g., preferred supplier, minimum bid, and supplier's reliability). Using IMPS (and distributed queueing) enables visibility between suppliers as well as between suppliers and the company (consumer). So a wheel manufacturer might be able to sign up for a bid but might hold off shipping until he sees other critical parts have gone through the fulfillment process.

In a trucking, cab or other fleet management environment, customer requests can appear as a buddy to fleet operators (simultaneously dispatched and queued as buddies) and fleet operators can hover to see location and destination information and sign up to handle the problem.

In field sales and field support environments, prospect information (or support information) from corresponding systems can appear as buddies to field sales, sales teams and support teams. In such an embodiment, the system would facilitate viewing, signing up and acting on the prospects as well as viewing and acting upon support needs.

In interactive gaming (e.g., war gaming), game artifacts, such as ammunition, artillery, tank shells, and tanks could appear as buddies and traded or exchanged between team members.

As described herein, various applications of IMPS technology have been described including text messaging, auctions, shopping, etc. As would be appreciated by one of ordinary skill in the art, such applications may be implemented as separate applications, each with their own interface, or may be combined to include a single interface for all applications implemented on the same IMPS client 200. The process of combining interfaces for multiple applications may be achieved through the use of object messages received from a remote server to an IMPS client 200. Such messages may be in the form of at least one of data, menu items and downloadable code. Alternatively, a "base" application for displaying a basic interface may be extended to include one or more mini-applications running in the context of the "base" application by dynamically linking code to or interpreting code in the "base" application.

Obviously numerous modifications of the above can be made without departing from the spirit of the present invention. Thus, only the claims appended hereto define the scope of protection afforded to the inventors.

The invention claimed is:

1. A method of utilizing an instant messaging protocol to monitor updated information relating to a transient object, the method comprising:
specifying, with a monitoring device, characteristics of a transient object to be continuously monitored by a participant at least until an expiration of the transient object;
receiving, at the monitoring device, a list of transient objects matching the specified characteristics;
displaying the list of transient objects on a display of the monitoring device;
receiving at the monitoring device, context specific information relating to at least one transient object in response to participant selection of the at least one transient object from the list;
displaying on the display of the monitoring device, the context specific information;
continuously monitoring the at least one transient object in response to participant selection of the at least one transient object from the list, using the monitoring device, at least until an expiration of the at least one transient object;
receiving at the monitoring device, in response to a change in state of the continuously monitored of the at least one transient object, updates relating to about the at least one transient object using presence messages of an immediate messaging and presence protocol of the monitoring device; and
displaying on the display of the monitoring device, the updates relating to the at least one transient object using an immediate messaging and presence protocol interface at the monitoring device.

2. The method as claimed in claim 1, wherein the transient object comprises an auction object.

3. The method as claimed in claim 1, wherein the transient object comprises a trouble ticket object.

4. The method as claimed in claim 1, wherein receiving a list of transient objects matching the characteristics comprises receiving a grouped list and displaying the list sorted by groups.

5. The method as claimed in claim 1, wherein displaying context specific information relating to the at least one transient object to be monitored comprises at least one of enabling and disabling a menu item associated with the at least one transient object to be monitored based on a change in the state of the at least one transient object to be monitored.

6. The method as claimed in claim 1, wherein displaying context specific information relating to the at least one transient object to be monitored comprises receiving the context specific information from a remote site and displaying at least one menu item including the context specific information from the remote site.

7. The method as claimed in claim 1, wherein displaying context specific information relating to the at least one transient object to be monitored comprises receiving a menu from a remote site and displaying at least one menu item of the menu received from the remote site.

8. The method as claimed in claim 1, wherein displaying context specific information relating to the at least one transient object to be monitored comprises displaying the context specific information relating to the at least one transient object in response to a mouse over.

9. The method as claimed in claim 1, wherein the immediate messaging and presence protocol comprises a protocol compatible with a messaging protocol selected from the group consisting of IMPP, APEX, PRIM, SIP/SIMPLE, XMPP, AOL IM, AIM, and Yahoo, Wanadoo & MSN Messenger.

10. A computer readable storage medium including computer instructions embedded therein for causing, upon execution of said computer instructions, a computer processor to perform the method, comprising:
specifying characteristics of a transient object to be monitored continuously by a participant at least until expiration of the transient object;
receiving a list of transient objects matching the specified characteristics;
displaying the list of transient objects;
receiving context specific information corresponding to at least one transient object in response to participant selection of the at least one transient object from the list of transient objects;
displaying the context specific information;
continuously monitoring the at least one transient object in response to participant selection of the at least one transient object from the list at least until an expiration of the at least one transient object;
receiving, in response to a change in state of the continuously monitored of the at least one transient object, updates relating to the at least one transient object using presence messages of an immediate messaging and presence protocol; and
displaying the updates relating to the at least one transient object using an immediate messaging and presence protocol interface.

11. The computer readable storage medium of 10, wherein the transient object comprises an auction object.

12. The computer readable storage medium of claim 10, wherein the transient object comprises a trouble ticket object.

13. The computer readable storage medium of claim 10, wherein receiving a list of transient objects comprises receiving a grouped list and displaying the list sorted by groups.

14. The computer readable storage medium of claim 10, wherein displaying context specific information relating to the at least one transient object to be monitored comprises at least one of enabling and disabling a menu item associated with the at least one transient object to be monitored based on a change in the state of the at least one transient object to be monitored.

15. The computer readable storage medium of claim 10, wherein displaying context specific information relating to the at least one transient object to be monitored comprises receiving the context specific information from a remote site and displaying at least one menu item including the context specific information from the remote site.

16. The computer readable storage medium of claim 10, wherein displaying context specific information relating to the at least one transient object to be monitored comprises receiving a menu from a remote site and displaying at least one menu item of the menu received from the remote site.

17. The computer readable storage medium of claim 10, wherein displaying context specific information relating to the at least one transient object to be monitored comprises displaying the context specific information relating to the at least one transient object in response to a mouse over.

18. The computer readable storage medium of claim 10, wherein the immediate messaging and presence protocol comprises a protocol compatible with a messaging protocol selected from the group consisting of IMPP, APEX, PRIM, SIP/SIMPLE, XMPP, AOL IM, AIM, and Yahoo, Wanadoo & MSN Messenger.

* * * * *